(12) United States Patent
Kudo

(10) Patent No.: US 7,858,248 B2
(45) Date of Patent: Dec. 28, 2010

(54) FUEL CELL AND FUEL CELL SYSTEM

(75) Inventor: Hiroyasu Kudo, Iwakura (JP)

(73) Assignee: Denso Corporation, Kariya (JP)

( * ) Notice: Subject to any disclaimer, the term of this patent is extended or adjusted under 35 U.S.C. 154(b) by 1347 days.

(21) Appl. No.: 11/345,291

(22) Filed: Feb. 2, 2006

(65) Prior Publication Data

US 2006/0172164 A1   Aug. 3, 2006

(30) Foreign Application Priority Data

Feb. 3, 2005   (JP) .............................. 2005-027713

(51) Int. Cl.
*H01M 8/04* (2006.01)
(52) U.S. Cl. ...................... 429/414; 429/431
(58) Field of Classification Search ................ 429/12, 429/13, 22, 24, 23, 26, 414, 431, 432, 434, 429/437, 442, 444
See application file for complete search history.

(56) References Cited

U.S. PATENT DOCUMENTS 6,106,963 A    8/2000  Nitta et al.
7,351,490 B2 * 4/2008  Tanaka et al. .................. 429/35

2005/0136306 A1 * 6/2005 Sugiura et al. ............... 429/26

FOREIGN PATENT DOCUMENTS

| JP | A 8-153525    | 6/1996  |
|----|---------------|---------|
| JP | A 10-321249   | 12/1998 |
| JP | A-2002-100381 | 4/2002  |
| JP | A 2003-217624 | 7/2003  |
| JP | A 2003-229165 | 8/2003  |

OTHER PUBLICATIONS

Aug. 24, 2010 Office Action issued in corresponding Japanese Patent Application No. 2005-027713 (with translation).

* cited by examiner

*Primary Examiner*—Jennifer Michener
*Assistant Examiner*—Monique Wills
(74) *Attorney, Agent, or Firm*—Oliff & Berridge, PLC

(57) ABSTRACT

A fuel cell system has a fuel cell stack, a controller, and a cooling water channel. The controller executes the control for the temperature of cooling water flowing through the cooling water channel in the fuel cell stack. When judging the necessity to increase an oxygen concentration of air at an area near an air outlet of the air channel, the controller instructs to change a temperature of the cooling water to a condense available temperature at which water vapor involved in the air at the area near the air outlet can be condensed in order to increase the oxygen concentration in the air at the area near the air outlet. As a result, the magnitude of the electric power generated by the fuel cell stack is increased efficiently.

12 Claims, 11 Drawing Sheets

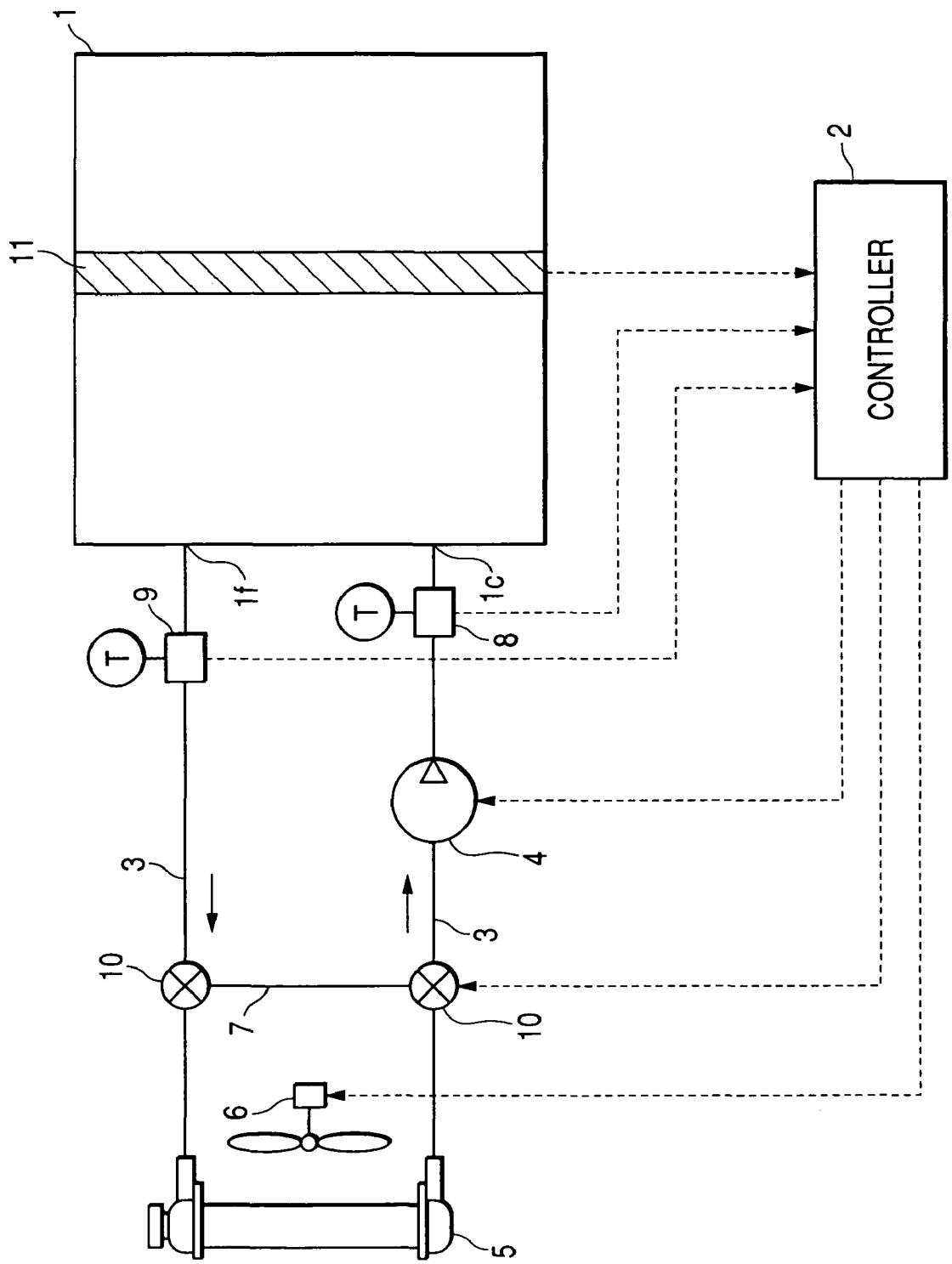

AIR CHANNEL

COOLING WATER CHANNEL

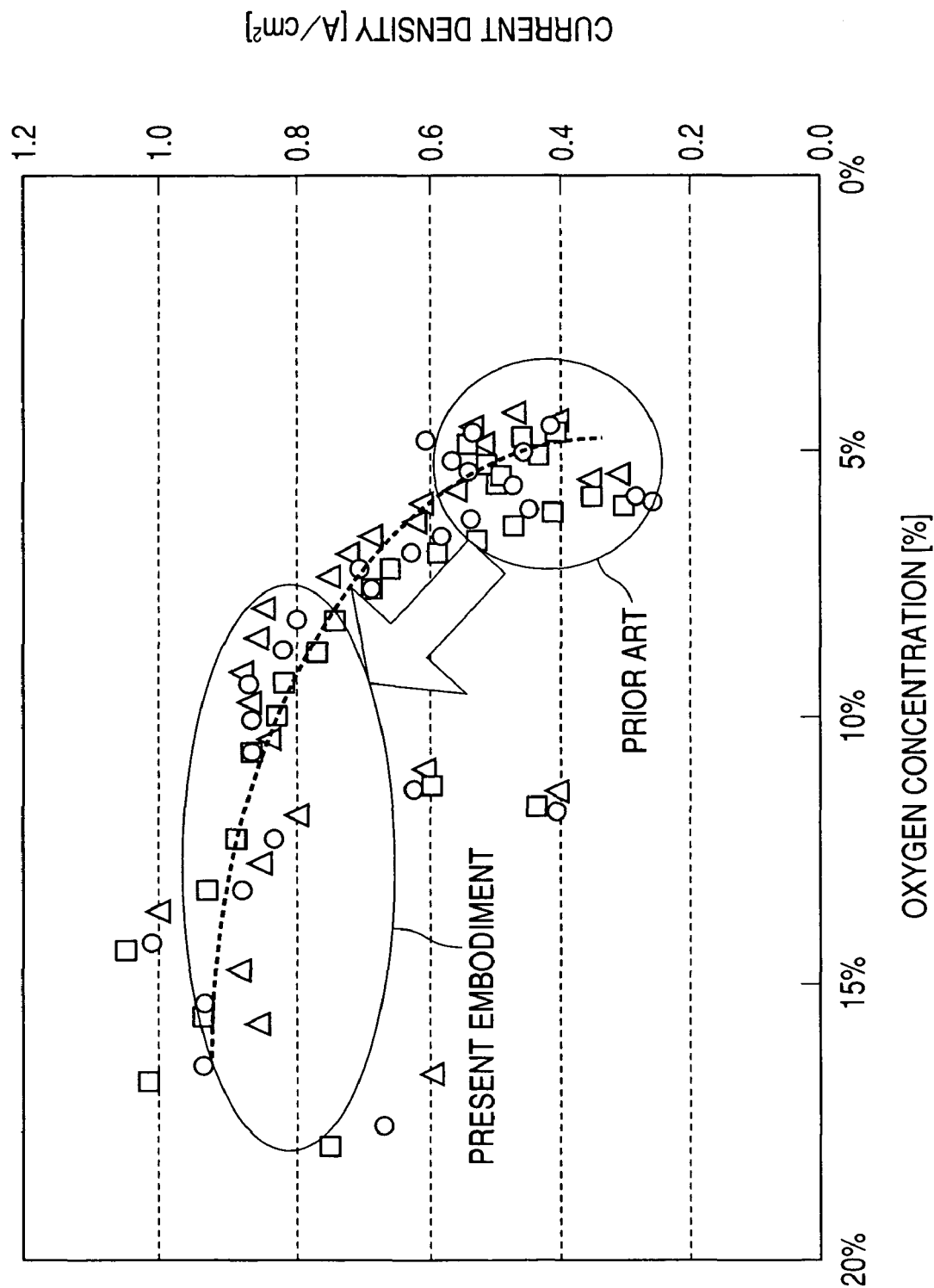

AIR CHANNEL

COOLING WATER CHANNEL

AIR CHANNEL

COOLING WATER CHANNEL

FUEL CELL AND FUEL CELL SYSTEM

CROSS-REFERENCE TO RELATED APPLICATIONS

This application is related to and claims priority from Japanese Patent Application No. 2005-27713 filed on Feb. 3, 2005, the contents of which are hereby incorporated by reference.

BACKGROUND OF THE INVENTION

1. Field of the Invention

The present invention relates to a fuel cell and a fuel cell system capable of increasing the efficiency of electric power generation.

2. Description of the Related Art

A fuel cell generates electric energy by electrochemical reaction of combining a hydrogen and oxygen. Such a fuel cell has generally a laminated structure in which a plurality of unit fuel cells is laminated as a FC stack.

Each unit fuel cell comprises an electrode membrane, an air electrode, and a fuel electrode. The electrode membrane is placed between the air electrode (as a cathode electrode) and the fuel electrode. The air electrode and the fuel electrode are hold by separators through which an oxidant gas (as cathode gas) and a fuel gas are introduced and flow. Air is used as the oxidant gas and hydrogen gas is used as the fuel gas.

The magnitude of the output electric power from the fuel cell is determined by the concentration of oxygen involved in air to be supplied to the fuel cell. Accordingly, the increasing of the output electric power of the fuel cell needs to increase the oxygen concentration in the air to be supplied to the fuel cell.

There are plural conventional techniques that have disclosed how to increase the oxygen concentration in air to be supplied to a fuel cell. Japanese patent laid open publications 2003-229165 and H10-321249 have disclosed a means to generate pure oxygen and to add the generated oxygen to air to be supplied to a fuel cell. A Japanese patent laid open publication 2003-217624 has disclosed a method how to increase the amount of air to be supplied to a fuel cell.

However, those conventional techniques involve drawbacks, for example, the former techniques disclosed by the Japanese patent laid open publications 2003-229165 and H10-321249 need the means with a complicated configuration and require to keep a place where the means is installed. The latter technique disclosed by the Japanese patent laid open publication 2003-217624 causes increasing of the power consumption of the means such as a compressor in order to increase the amount of the air supply. This technique also decreases the entire efficiency of the fuel cell system.

In general, the oxygen concentration in the air flowing through an air channel in the fuel cell takes the lowest value at the place near an air outlet in the air channel. This means that the oxygen in the air is consumed by the electric generation during the air flow from an inlet to the outlet of the air channel, and the oxygen concentration is thereby gradually decreased and, on the other hand, the amount of water vapor in the air is gradually increased because the water generated in the electric generation becomes water vapor and added into the air.

Accordingly, it may be considered that the increasing of the output power of the fuel cell requires increasing the oxygen concentration in the air at the area near the air outlet of an air channel.

SUMMARY OF THE INVENTION

It is an object of the present invention to provide an improved fuel cell system and a fuel cell to be fitted to the fuel cell system with a simple configuration, that is capable of increasing the efficiency of electric power generation by the fuel cell without adding devices to the fuel cell system and increasing the entire output electric power of the fuel cell system.

To achieve the above purposes, the present invention provides a fuel cell and a fuel cell system. The fuel cell system has a fuel cell stack, a coolant temperature control means, a judgment means, and a generation and output means. The fuel cell stack has plural unit fuel cells. Each unit fuel cell has a fuel electrode, an air electrode, an electrode membrane, a fuel gas channel, and an air channel. The electrode membrane is placed between the fuel electrode and the air electrode. Through the fuel gas channel a fuel gas is supplied to the fuel electrode and through the air channel the air is supplied to the air electrode. Through the coolant channel a coolant is introduced and flowing. The coolant temperature control means is configured to adjust a temperature of the coolant. The judgment means is configured to judge whether or not there is a necessity to increase an oxygen concentration in the air at an area near an air outlet of the air channel. Based on the judgment result transferred from the judgment means, the generation and output means generates an instruction signal indicating that the temperature of the coolant is changed to a concentration available temperature at which a water vapor in the air at the area near the air outlet in the air channel. The generation and output means then outputs the instruction signal to the coolant temperature control means in order to control the electric power generation of the fuel cell stack.

BRIEF DESCRIPTION OF THE DRAWINGS

For a better understanding of the present invention and to show how the same may be carried out into effect, there will now be described by way of example only, specific embodiments and methods according to the present invention with reference to the according to the present invention.

FIG. 1 is a diagram showing the entire configuration of a fuel cell system according to a first embodiment of the present invention;

FIG. 3A shows an air channel formed in one surface (as an air channel surface) of the separator, and FIG. 3B shows a cooling water channel formed in the other surface (or the opposite surface) to the surface where the air channel is formed;

FIG. 6 shows a measurement result of a current density at an area near the air outlet of the fuel cell of the first embodiment, measured at Step 33 in the flow chart shown in FIG. 4;

FIG. 7A shows an air channel formed in an air channel surface of the separator, and FIG. 7B shows a cooling water channel formed in the other surface (or the opposite surface) to the air channel surface where the air channel is formed;

FIG. 8A shows an air channel formed in an air channel surface of the separator, and FIG. 8B shows a cooling water channel formed in the other surface (or the opposite surface) to the air channel surface where the air channel is formed;

FIG. 9A shows a single air inlet and plural air sub channels formed in an air channel surface of the separator, and FIG. 9B shows plural cooling water sub channels formed in the other surface (or the opposite surface) to the air channel surface where the air channel is formed;

DETAILED DESCRIPTION OF THE PREFERRED EMBODIMENTS

Figure 2A:
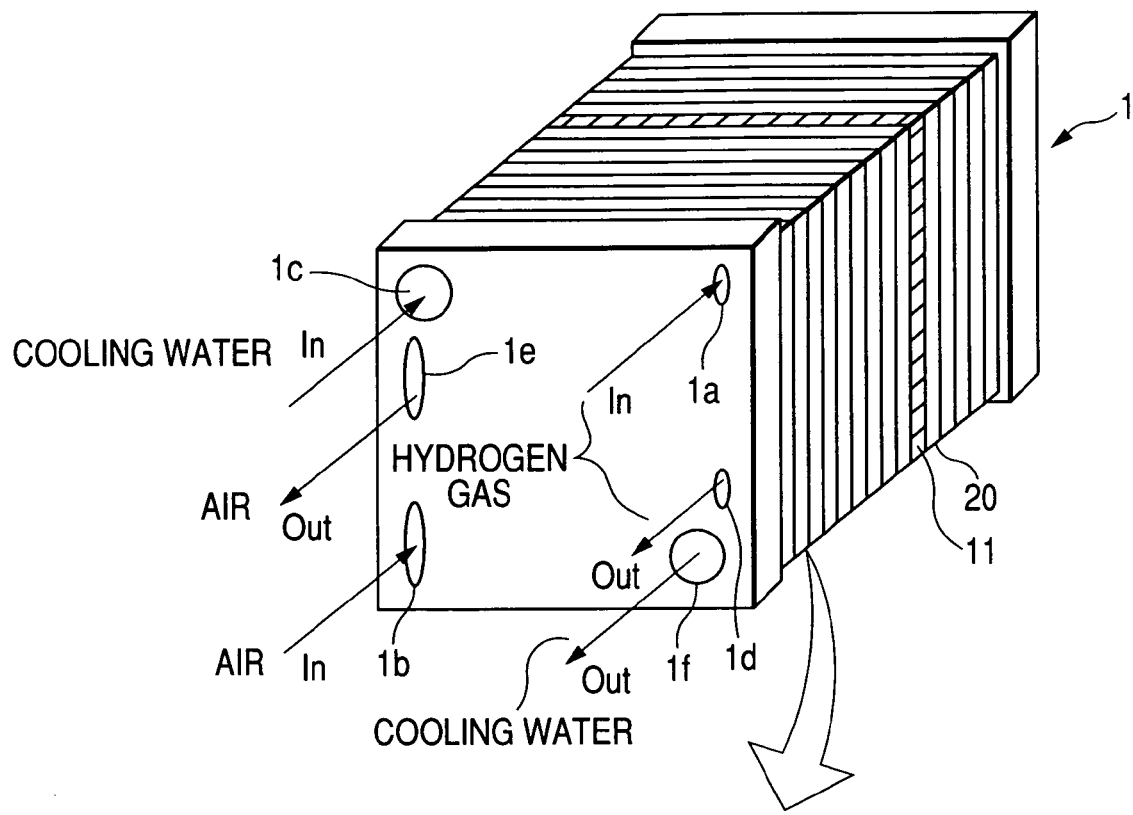
FIG. 2A is a perspective diagram showing a fuel cell stack in the fuel cell system shown in FIG. 1.

Hereinafter, various embodiments of the present invention will be described with reference to the accompanying drawings. In the following description of the various embodiments, like reference characters or numerals designate like or equivalent component parts throughout the several views.

First Embodiment

FIG. 1 is a diagram showing the entire configuration of the fuel cell system according to the first embodiment of the present invention. As shown in FIG. 1, the fuel cell system of the first embodiment comprises a fuel cell stack 1 made of a plurality of unit fuel cells, a controller 2, and a cooling water channel 3 through which the cooling water as a coolant flows.

The fuel cell system of the first embodiment further comprises a hydrogen gas supply channel (not shown), a hydrogen gas exhaust channel (not shown), an air supply channel (not shown) and an air exhaust channel (not shown). Through the hydrogen gas supply channel, hydrogen gas is supplied to the fuel cell stack 1. The hydrogen gas exhausted from the fuel cell stack 1 flows through the hydrogen gas exhaust channel. Through the air supply channel air is supplied to the fuel cell stack 1. Through the air exhaust channel the air exhausted from the fuel cell stack 1 flows. The embodiments according to the present invention use the unit fuel cell of a solid polymer electrolyte (SPE) forming the fuel cell stack 1, for example.

The water cooling channel 3 is a passage through which the cooling water as a coolant flows. The cooling water cools the inner section of the fuel cell stack 1 and also cools the air in the air channel of the unit fuel cell. The cooling water channel 3 is joined to a cooling water inlet 1c and a cooling water outlet 1f of the fuel cell stack 1.

The cooling water channel 3 is equipped with a water pump 4, a radiator 5, a cooling wind fun 6, a radiator bypass channel 7, a first temperature sensor 8, and a second temperature sensor 9.

The water pump 4 serves as a circulation means for circulating the cooling water flowing through the fuel cell stack 1. The radiator 5 and the cooling wind fun 6 adjust the temperature of the cooling water flowing through the cooling water channel 3. When receiving an operation control signal transferred form the controller 2, the water pump 4 and the cooling wind fun 6 initiate the operation. The radiator 5 and the cooling wind fun 6 correspond to a coolant temperature adjusting means of the present invention.

The radiator bypass channel 7 is joined to the cooling water channel 3 through the temperature adjusting valves 10 mounted on the cooling water channel 3. The radiator bypass channel 7 is used for a case of not necessary to cool the cooling water.

The first temperature sensor 8 is mounted near the cooling water inlet 1c of the fuel cell stack 1 in order to measure the temperature of the cooling water to be supplied to the fuel cell stack 1. The second temperature sensor 9 is mounted near the cooling water outlet 1f of the fuel cell stack 1 in order to measure the temperature of the cooling water exhausted from the fuel cell stack 1. The first and second temperature sensors 8 and 9 measure the temperature of the cooling water and generate and then transfer the measurement results to the controller 2.

Figure 2B:
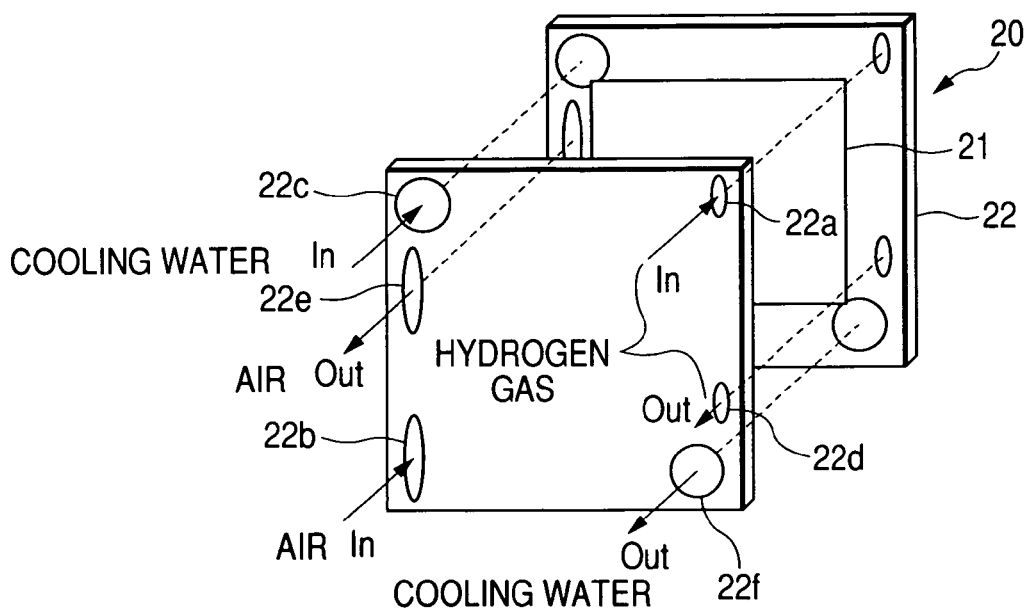
FIG. 2B is a perspective diagram showing a disassembled configuration of a unit fuel cell forming the fuel cell stack shown in FIG. 2A.

FIG. 2A is a perspective diagram showing the fuel cell stack 1 in the fuel cell system of the first embodiment. FIG. 2B is a perspective diagram showing a disassembled configuration of a unit fuel cell 20 forming the fuel cell stack 1 shown in FIG. 2A. The fuel cell stack 1 is composed of a plurality of the unit fuel cells 20. As shown in FIG. 2A, the fuel cell stack 1 has a stack configuration in which the plural unit fuel cells 20 are stacked in a laminated configuration. The unit fuel cells 20 stacked are electrically connected in series. One end of the fuel cell stack 1 is equipped with a hydrogen gas inlet 1a, an air inlet 1b, a cooling water inlet 1c, a hydrogen gas outlet 1d, an air outlet 1e, and a cooling water outlet 1f.

The hydrogen gas, the air, and the cooling water are introduced into the fuel cell stack 1 through the hydrogen gas inlet 1a, the air inlet 1b, and the cooling water inlet 1c, respectively. The hydrogen gas, the air, and the cooling water are exhausted from the fuel cell stack 1 through the hydrogen gas outlet 1d, the air outlet 1e, and the cooling water outlet 1f.

The hydrogen gas inlet 1a, the air inlet 1b, the hydrogen gas outlet 1d, and the air outlet 1e are joined to the hydrogen gas channel, the air supply channel, the hydrogen gas exhaust channel, and the air exhaust channel, respectively. The cooling water inlet 1c and the cooling water outlet 1f are joined to the cooling water channel 3.

The unit fuel cell 20 comprises the MEA 21 (membrane Electrode assembly) and separators 22 between which the MEA 21 is sandwiched.

Each separator 22 is made of a conductive material such as carbon material capable of preventing the passing of gas. Each separator 22 is equipped with a hydrogen gas inlet 22a, an air inlet 22b, a cooling water inlet 22c, a hydrogen gas outlet 22d, an air outlet 22e, and a cooling water outlet 22f.

The hydrogen gas, the air, and the cooling water are introduced into the unit fuel cell 20 through the hydrogen gas inlet 22a, the air inlet 22b, and the cooling water inlet 22c, respectively. The hydrogen gas, the air, and the cooling water are exhausted from the unit fuel cell 20 through the hydrogen gas outlet 22d, the air outlet 22e, and the cooling water outlet 22f.

The cooling water inlet 22c is formed in position adjacent to the air outlet 22e. Each separator 22 is equipped with a hydrogen gas channel, an air channel 24, and a cooling water channel 25 through which the hydrogen, the air, and the cooling water to be supplied to the fuel cell stack 1 are flowing, respectively.

Figure 3A:
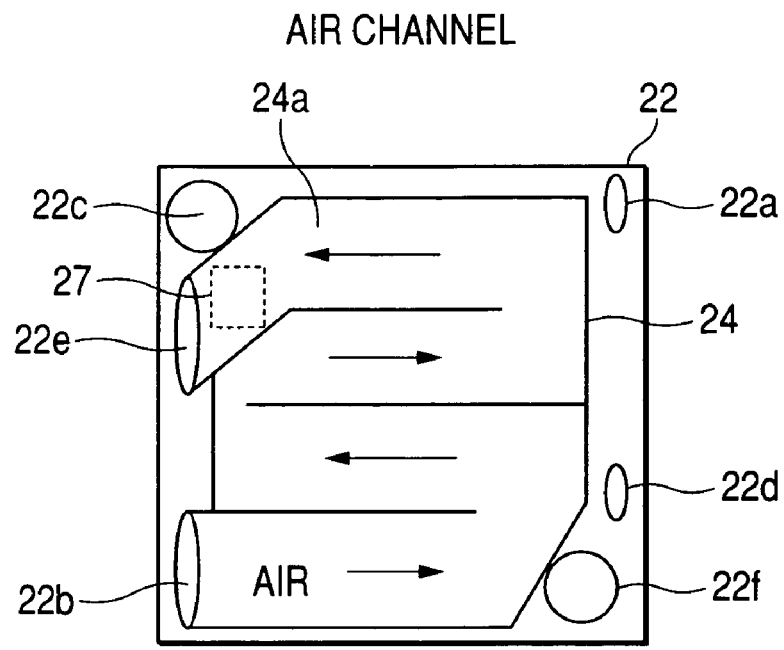
FIGS. 3A and 3B are diagrams showing a configuration of an air electrode end (or a cathode electrode) of a separator forming the fuel cell, in particular.
Figure 3B:
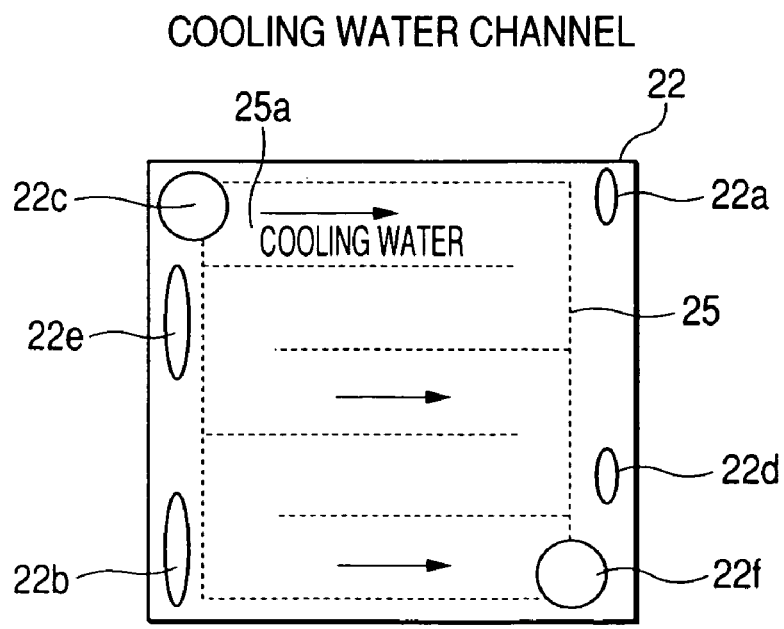

FIG. 3A shows the air channel 24 formed in one surface (air electrode surface) of the separator 22. FIG. 3B shows the cooling water channel 25, observed from the air electrode surface of the separator 22, formed in the other surface (fuel electrode surface) of the separator 22 in which the air channel is formed.

The hydrogen gas channel is made of grooves that are formed in the fuel electrode surface of the separator 22 and is formed in layout so that the hydrogen gas channel flows from the hydrogen gas inlet 22a to the hydrogen gas outlet 22d.

The air channel 24 is made of grooves that are formed in the air electrode surface of the separator 22 and is formed in layout shown in FIG. 3A so that the air flows from the air inlet 22b to the air outlet 22b.

The cooling water channel 25 is made of grooves formed in the surface that is opposed to the air electrode surface of the separator 22.

The cooling water channel 25 corresponds to the coolant channel of the present invention. The cooling water channel 25 is so formed in layout shown in FIG. 3B in which the cooling water flows from the cooling water inlet 22c to the cooling water outlet 22f. The upstream end 25a of the cooling water channel 25 is placed at the area in position corresponding to the downstream end of the cooling water channel 25. Accordingly, the hydrogen gas flowing through the hydrogen gas channel is introduced to the fuel cell stack 1 through the hydrogen gas inlet 1a and the hydrogen gas then flows through the hydrogen gas inlet 22a of each unit fuel cell 20 in a lamination direction. Finally, the hydrogen gas is exhausted to the hydrogen gas exhaust channel from the hydrogen gas outlet 1d of the fuel cell stack 1 through the hydrogen gas channel and each hydrogen gas outlet 22d of each unit fuel cell 20.

Similarly, the air flowing through the air supply channel is introduced from the air inlet 1b to the fuel cell stack 1. The air is then flowing in the direction of the laminated structure of the unit fuel cells through the air inlet 22b of each unit fuel cell 20 and through the air channel 24 from the air inlet 22b of each unit fuel cell 20. The air flows to the air exhaust channel from the air outlet 1e of the fuel cell stack 1.

Similarly, the cooling water flowing through the cooling water channel 3 is introduced from the cooling water inlet 1c (see FIG. 2A) to the fuel cell stack 1. The cooling water is then flowing in the direction of the laminate d structure of the unit fuel cells through the cooling water inlet 22c of each unit fuel cell 20 and through the cooling water channel 25 from the cooling water inlet 22c of each unit fuel cell 20. The cooling water outputs to the cooling water exhaust channel from the cooling water outlet 1f of the fuel cell stack 1.

The MEA 21 of each unit fuel cell 20 comprises an electrode membrane made of a proton conductive ion-exchange membrane (omitted from drawings) and electrodes formed both sides of the electrode membrane.

The electrodes are composed of a catalyst layer and a gas diffusion layer. One electrode of each unit fuel cell 20 is formed as the air electrode (positive electrode) to which the air is supplied and the other electrode is formed as the fuel electrode (negative electrode) to which the hydrogen gas as fuel gas is supplied.

In each unit fuel cell 20, the hydrogen gas is supplied to the fuel electrode, an electrochemical reaction occurs between the oxygen gas and the hydrogen gas, and generates an electrical energy. Water is generated in the air electrode by performing the electrochemical reaction between the hydrogen gas and oxygen gas in the air supplied.

Fuel electrode: $H_2 \rightarrow 2H^+ + 2e^-$, and

Air electrode: $2H^+ + \frac{1}{2}O_2 + 2e^- \rightarrow H_2O$.

As shown in FIG. 1 and FIG. 2A, a current sensor plate 11 is placed between each unit fuel cell 20 in the fuel cell stack 1. The current sensor plate 11 corresponds to a local current measurement means of the present invention. The current sensor plate 11 measures a current generated in the unit fuel cell 20, namely a local current. In the embodiments, the current sensor plate 11 measures a current generated in an area 27, shown in FIG. 3A, of the unit fuel cell 20 near the air outlet 22e.

The current sensor plate 11 is composed of a conductive material that is made of a conductive part through which adjacent unit fuel cells are connected to each other and a current sensor for measuring the current flowing through the conductive part, for example.

The controller 2 executes a process for a cooling water temperature adjusting control that will be explained later. The controller 2 has a memory section as a memory means (not shown). The memory section stores a threshold current value that will also be described later. The controller 2 comprises a microcomputer commercially available having a CPU (central processing unit), a ROM (read only memory), and a RAM (random access memory) and other elements and peripheral circuits.

Next, a description will now be given of the operation for the cooling water temperature control to be executed by the controller 2.

Figure 4:
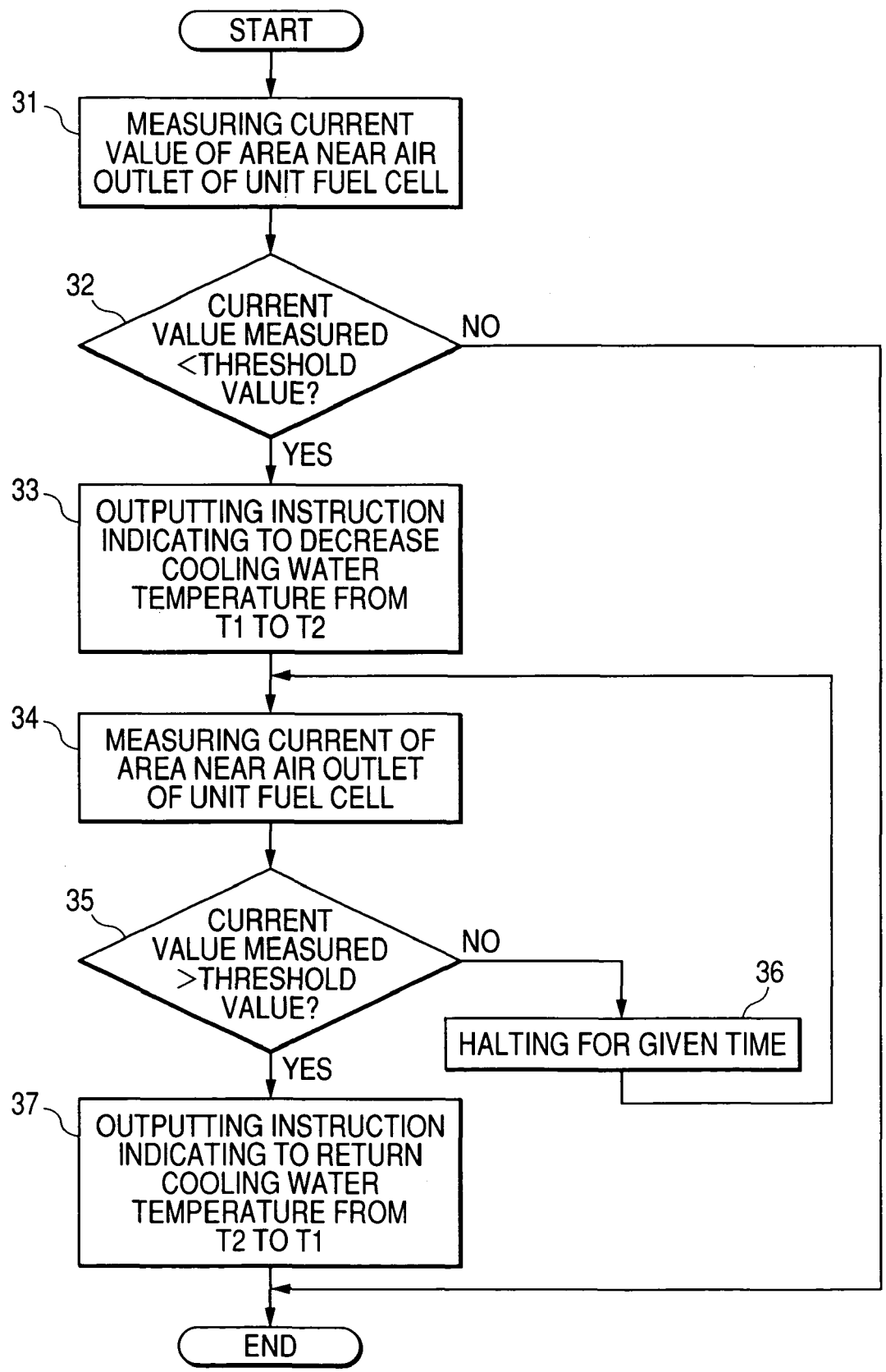
FIG. 4 is a flow chart showing a manner to control the temperature of the cooling water performed by a controller.

FIG. 4 is a flow chart showing the manner of controlling the temperature of the cooling water executed by the controller 2.

The control of cooling the temperature of the cooling water is initiated upon the initiation of the operation of the fuel cell stack 1 and continued with a given time interval. Step 32 and Step 33 shown in FIG. 4 correspond to the operation of the control means and the generation and output means of the present invention.

The current sensor plate 11 measures the current generated in the area near the air outlet 22e of the unit fuel cell 20. In Step 31, the current value measured is transferred to the controller 2 from the current sensor plate 11 (as a local current measurement means).

Following, in Step 32, the current value generated is compared with a threshold value that has been stored in advance in the memory section whether or not the current value is smaller than the threshold value. The threshold value is selected from IV characteristic table (not shown) of the unit fuel cell 20 that has been investigated in advance. For example, if the entire current density of the unit fuel cell 20 is 0.7 A/cm$^2$, the current threshold value is set to 0.3 A/cm$^2$.

When the oxygen concentration of the air at the area near the air outlet 22e in the air channel 24 is lower, the generation current value of the area 27 near the air outlet 22e becomes decreased. In this case, it is necessary to increase the oxygen concentration by increasing the amount of the current generated in the area 27 near the air outlet 22e in the unit fuel cell 20.

In Step 32 of the present embodiment, the controller 2 detects the necessity to increase the current value at the area 27 near the air outlet 22e of the unit fuel cell 20 by detecting whether the current value generated at the area 27 is greater than the given current threshold value.

In Step 32, when the controller 2 detects that the current value generated is smaller than the current threshold value that has been stored in the memory in advance, namely detects "YES", the operation flow progresses to Step 33. On the contrary, when the controller 2 detects the generated current value is not smaller than the current threshold value, namely "NO", the operation flow goes to "END", that is the detection operation is completed.

In Step 33, the controller 2 transfers to the cooling wind fun 6 and the temperature adjusting valve 10 the operation instruction signal to instruct that the temperature T1 of the cooling water is decreased to T2, where T1 is a normal temperature and T2 is a condensation available temperature of the cooling water at which the cooling water is condensed. At this time, the controller 2 outputs to the cooling wind fun 6 the operation instruction signal according to the measured temperature detected by and transferred from the first temperature sensor 8.

The normal temperature T1 is the temperature at which the fuel cell stack 1 is kept at a given temperature in order that the temperature of the electrode membranes becomes over its heat resistance temperature during the normal operation of the fuel cell stack 1. On the contrary, the condensation available temperature T2 is the temperature lower than an operation temperature of the fuel cell stack 1 when the air in the air channel 24 involves saturated steam at the operation temperature of the fuel cell stack 1. That is, the condensation available temperature T2 is lower than the normal temperature T1.

When the air in the air channel 24 does not involve saturated steam at the operation temperature of the fuel cell stack 1, the condensation available temperature T2 is lower than the temperature at which the water vapor or steam in the air is saturated.

In an concrete example, the condensation available temperature T2 is set to a temperature being lower by 20° C. than the temperature measured by the second temperature sensor 9. For example, when the temperature measured by the second temperature sensor 9 is 80° C., the condensation available temperature T2 becomes 60° C.

Thus, the temperature of the cooling water flowing through the cooling water channel 3 is set to 60° C. by the cooling wind fun 6 and the temperature adjusting valve 10 under the controller 2.

Because the saturation available temperature T2 of a lower value reduces the efficiency of the electric power generation in the fuel cell stack 1, it is preferred to keep the saturation available temperature T2 within a temperature range capable of condensing the water vapor involved in the air of the air channel 24 and also capable of keeping the efficiency of the electric power generation by the fuel cell stack 1. For example, the upper limit and the lower limit of the saturation available temperature T2 are set to 60° C. and 30° C., respectively. Thus, it is further preferred to set the saturation available temperature T2 to the temperature range of 30° C. to 60° C.

In Step 34, the current sensor plate 11 as the local current measurement means measures the generated current value at the area 27 near the air outlet 22e of the unit fuel cell 20. The measured value by the current sensor plate 11 is transferred to the controller 2.

Following, in Step 35, it is checked whether or not the measured current value (that is, the generated current value in the unit fuel cell 20) is greater than the current threshold value that is stored in the memory section in advance.

When the comparison result indicates the generated current value is greater than the current threshold value, that is indicates "YES" in Step 35, the operation flow goes to Step 37. On the contrary, the comparison result indicates "NO", the operation flow progresses to Step 36.

In Step 36, the operation is halt during a given time period. After the given time period is elapsed, the operation flow returns to Step S34.

On the other hand, in Step 37, the controller 2 generates and transfers the operation instruction signal to the cooling wind fun 6 and the temperature adjusting valve 10. The operation instruction signal indicates to change the temperature of the cooling water from the saturation available temperature T2 to the normal temperature T1. In an actual operation, the revolution of the cooling wind fun 6 is reduced and the cooling water flows through the radiator bypass channel 7 by the temperature adjusting valve 10 under the control of the controller 2. When the temperature of the cooling water is returned from T2 to T1, the cooling water control operation is completed.

Next, a description will now be given of the features (1) to (3) of the fuel cell and the fuel cell system according to the first embodiment of the present invention.

(1) As described above in detail, the fuel cell system of the first embodiment comprises the fuel cell stack 1, the controller 2, and the cooling water channel 3. The fuel cell stack 1 has a plurality of the unit fuel cells that are laminated. The separator 22 forming the unit fuel cell 20 is equipped with the air channel 24 and the cooling water channel 25. The radiator 5, the cooling wind fun 6, the first temperature sensor 8, the radiator bypass channel 7, the temperature adjusting valve 10 are mounted on the cooling water channel 2.

The controller 2 executes the cooling water temperature control. In Step 32, the controller 2 judges whether or not the current value measured at the area 27 near the air outlet 22e measured by the current sensor plate 11 is smaller than the current threshold value. When the detection result indicates that the measured current is smaller than the current threshold value, in Step 33 the controller 2 generates and transfers the operation instruction signal to reduce the temperature of the cooling water from the normal temperature T1 to the saturation available temperature T2. The operation in Step 33 changes the temperature of the cooling water flowing through the cooling water channel 3 to the saturation available temperature T2, and the cooling water of the temperature T2 flows into the fuel cell stack 1.

This operation can reduce forcedly the temperature of the air flowing through the air channel 24 from the normal temperature T1 to the saturation available temperature T2. It is thereby possible to reduce the saturated vapor pressure of the air and to condense the water vapor contained in the air.

A description will now be given of a relationship between the amount of the water vapor in air and the oxygen concentration in air.

Figure 5:
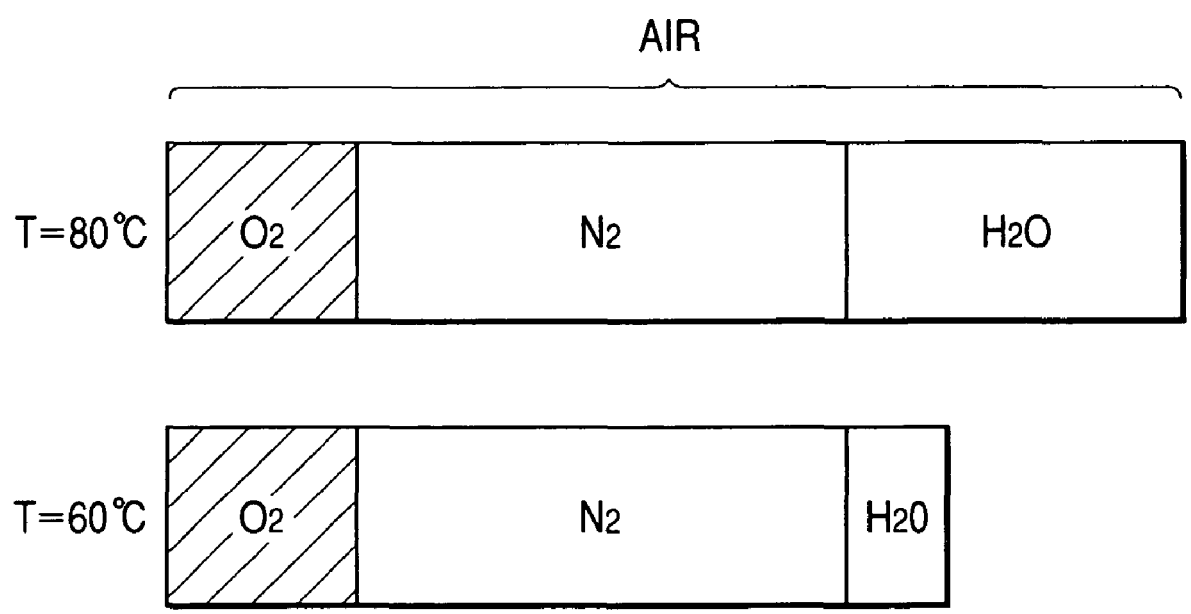
FIG. 5 is a schematic diagram explaining the states before and after the oxygen concentration in air under temperatures T=80° C. (before) and T=60° C. (after)

FIG. 5 is a schematic diagram explaining the states before and after the oxygen concentration in air under both the temperatures T=80° C. (before) and T=60° C. (after).

In general, air contains mainly oxygen, nitrogen, and water vapor. The molar concentration of oxygen in air is the number of moles of oxygen against the total number of moles of oxygen, hydrogen, and water vapor. As shown in FIG. 5, when the temperature of the air in the air channel 24 changes from 80° C. (before, see FIG. 5A) to 60° C. (after, see FIG. 5B), a part of the water vapor in the air is condensed, so that the number of moles of the water vapor in the air is reduced. In this case, although the number of moles of the hydrogen is not changed, the total number of moles of the air is reduced and the number of moles of the oxygen in the air can be increased.

According to the first embodiment, it is possible to increase the oxygen concentration in the area near the air outlet 22e in the air channel 24. This means that an oxygen diffusion rate to the MEA 21 from the air channel 24 can be increased and the amount of current generated at the area near the air outlet 22e in the unit fuel cell 20 can be thereby increased.

That is, the configuration and operation of the present embodiment can increase the electric power generation at the area 27 near the air outlet 22e in the unit fuel cell 20 even if the oxygen concentration in the air flowing through the air channel 24 at the area near the air outlet 22e is reduced and even if the electric power generation at the area 27 near the air outlet 22e in the unit fuel cell 20 is reduced.

FIG. 6 shows a measurement result of the current density at the area 27 near the air outlet 22e of the unit fuel cell 20 of the first embodiment when Step 33 in the flow chart shown in FIG. 4 is performed.

As shown in FIG. 6, when compared with the prior art which does not execute the operation of Step 33, the oxygen concentration at the area near the air outlet 22e in the air channel 24 can be increased and the current density is thereby also increased at the area 27 near the air outlet 22e of the unit fuel cell 20 after the execution of Step 33.

(2) Although the conventional fuel cell system is equipped with the cooling water channel 3, the radiator 5, and the cooling wind fun 6, the fuel cell system of the first embodiment can control the temperature of the cooling water by using those components without additional specific devices. Further, the fuel cell system of the first embodiment does not need to increase the amount of the air to be supplied.

That is, the first embodiment of the present invention can increase the output power of the fuel cell stack 1 without additional specific devices such as hydrogen generation means to be added to the configuration of the conventional fuel cell system and without using means such as a compressor and without increasing the entire power consumption of the fuel cell system.

(3) In the configuration of the fuel cell system according to the first embodiment, the cooling water inlet 22c is arranged adjacent to the air outlet 22e, and the upstream part 25a of the cooling water channel 25 is arranged in the separator 22 in position corresponding to the downstream part 24a of the air channel 24.

This configuration can cool the area near the air outlet 22e of the air channel 24, prior to any other part of the air channel 24, by the cooling water. Therefore it is possible to easily perform the temperature control of the area near the air outlet 22e in the air channel 24 when compared with the conventional case in which the cooling water inlet 22c is apart in position from the air outlet 22e such as the case in which the cooling water inlet 22c is arranged near the air inlet 22b.

According to the first embodiment, it is possible to easily control the temperature of the area near the air outlet 22e in the air channel 24 with the saturation available temperature by controlling the cooling water when compared with the conventional case in which the cooling water inlet is apart from the air outlet.

Although the first embodiment has shown the preferred configuration having the single current sensor 11 placed at the middle position in the fuel cell stack 1 shown in FIG. 1 and FIG. 2A, the concept of the present invention is not limited by this. For example, it is acceptable to place the current sensor plate 11 at another position in the fuel cell stack 1 or to use plural current sensor plates at other appropriate positions according to a purpose of detecting the current.

The present invention can decrease the amount of water vapor involved in the air at the area near the air outlet of the air channel by condensing the water vapor in the air. Even if the number of moles of oxygen in the air is not changed, the number of moles of gases forming the air can be decreased. Accordingly, it is possible to increase the oxygen concentration in the air at the area near the air outlet.

Further, the devises such as a radiator and a cooling wind fun forming a conventional fuel cell system can be used as the coolant temperature adjusting means of the present invention without additional specific devices and the present invention can increase the output of the fuel cell stack even if the entire power consumption of the fuel cell system is not increased.

Second Embodiment

In the configuration of the fuel cell system according to the first embodiment described above, the single cooling water inlet 22c is formed in the separator 22. However, the concept of the present invention is not limited by the configuration of the first embodiment it is possible to form a pair of the cooling water inlets in the separator in the unit fuel cell.

Figure 7A:
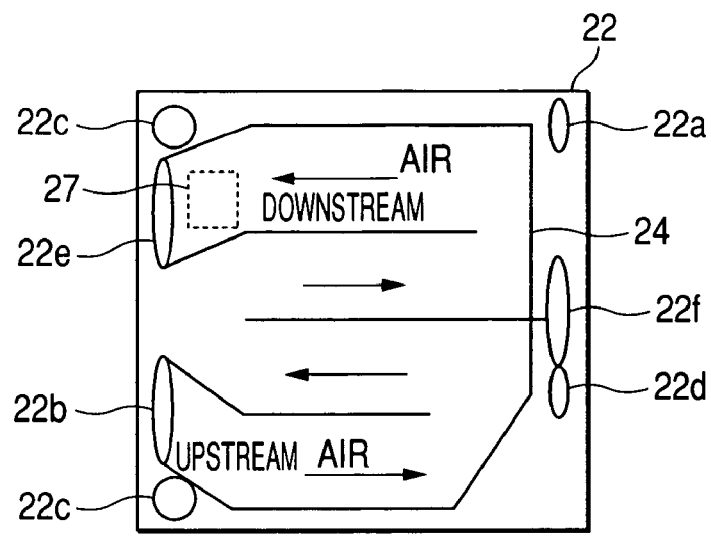
FIGS. 7A and 7B are diagrams showing a configuration of an air electrode end (or a cathode electrode) of a separator forming the unit fuel cell according to a second embodiment, in particular.
Figure 7B:
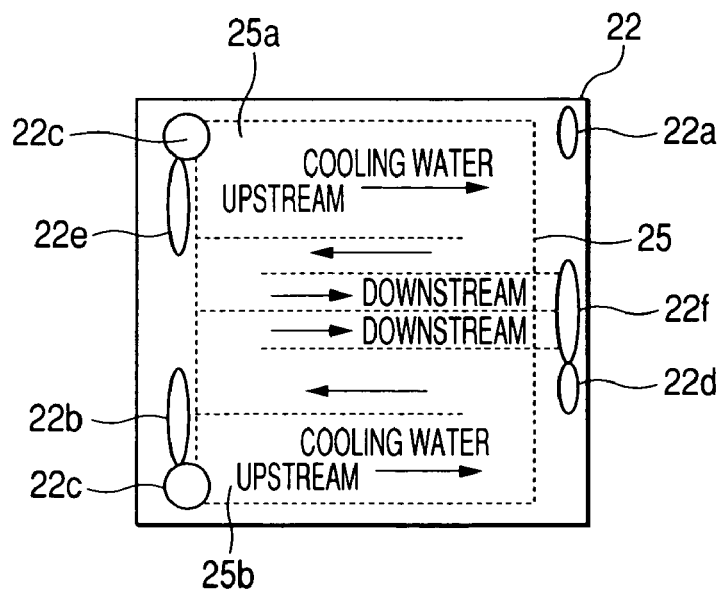

FIGS. 7A and 7B are diagrams showing a configuration of an air electrode end (or a cathode electrode) of the separator forming the fuel cell system according to the second embodiment. In particular, FIG. 7A shows the air channel formed in the air channel surface of the separator, and FIG. 7B shows the cooling water sub channels formed in the other surface (or the opposite surface) to the air channel surface where the air channel is formed.

The configuration shown in FIG. 7A and FIG. 7B according to the second embodiment corresponds to that shown in FIG. 3A and FIG. 3B of the first embodiment. The same components will therefore be referred to with the same reference characters and the explanation of those same components is omitted here.

As shown in FIG. 7A and FIG. 7B, the second embodiment has a pair of the cooling water inlets 22c per separator 22, one inlet 22c of the cooling water is arranged at the area near the air outlet 22e like the configuration of the first embodiment, and the other inlet 22c of the cooling water is arranged at the area near the air inlet 22b.

In the second embodiment, as shown in FIG. 7B, the cooling water channel 25 is divided into a pair of cooling water sub channels 25a and 25b arranged at the upstream part and the downstream part of the separator 22. The cooling water is supplied to both the cooling water sub channels 25a and 25b through both the cooling water inlets 22c. The cooling water flows through both the cooling water sub channels 25a and 25b shown in FIG. 7B into the single cooling water outlet 22f. The cooling water to be supplied to each of both the cooling water inlets 22c has the condensation available temperature T2.

In a concrete example, as shown in both FIG. 7A and FIG. 7B, the cooling water sub channel 25b (see the lower end in FIG. 7B) as the upstream end of the cooling water channel 25 is arranged at the area in position corresponding to the upstream part of the air channel 24 (see the lower end in FIG. 7A).

When compared with the air channel 24 of the first embodiment shown in FIG. 3A, although the position of the air channel is shifted slightly by adding a pair of the cooling water inlets 22c, the configuration of the air channel 24 shown in FIG. 7A has almost the same configuration of the air channel of the first embodiment shown in FIG. 3A.

Thus, in the configuration of the fuel cell system of the second embodiment, the cooling water inlets 22c are arranged near the air inlet 22b in addition to the air outlet 22e, and the cooling water sub channel 25b as the upstream end of the cooling water channel 25 is arranged at the area corresponding to the upstream end of the air channel 24. This configuration of the second embodiment can reduce the temperature of the area near the air inlet 22b of the air channel 24 rather than the operation temperature of the fuel cell stack 1, so that the saturation water vapor can be reduced in order to set the temperature of the water vapor in the air into the condensation available temperature.

This can condense the water vapor at the area near the air inlet 22b of the air channel 24 and increase a relative humidity of the air, so that it is possible to keep the air at the area near the plural cooling water inlets 22c for the electrode membrane film in the MEA 21 with humidity state and thereby to prevent the drying of the electrode membrane forming the unit fuel cell 20.

The second embodiment has shown the configuration in which the cooling water channel is divided into a pair of the cooling water sub channels. However, the concept of the present invention is not limited by this configuration, for example, the number of the cooling water inlets can be set to not less than three. In this case, at least two in a plurality of the cooling water inlets are arranged at both areas near the air outlet 22e and the air inlet 22b.

Third Embodiment

The first and second embodiments have shown the configuration of the air channel having the single air channel formed between the air inlet 22b and the air outlet 22e. The third embodiment has the configuration in which the air channel has a plurality of air sub channels formed between plural air inlets 22b and the single air outlet 22e.

Figure 8A:
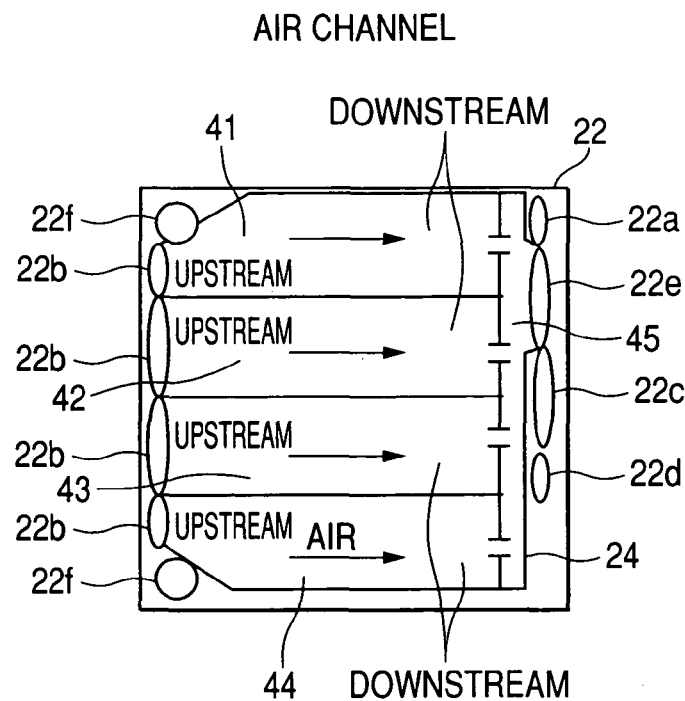
FIGS. 8A and 8B are diagrams showing a configuration of an air electrode end (or a cathode electrode) of a separator forming the unit fuel cell according to a first example of a third embodiment, in particular.
Figure 8B:
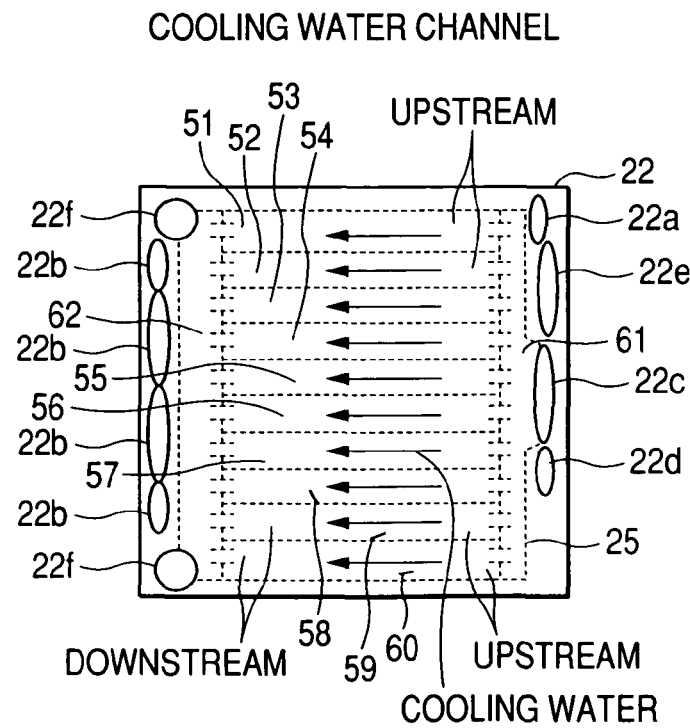

FIGS. 8A and 8B are diagrams showing a configuration of the air electrode end (or the cathode electrode) of the separator forming the fuel cell according to a first example of the third embodiment. In particular, FIG. 8A shows the plural air sub channels formed in the air channel surface of the separator. FIG. 8B shows plural cooling water sub channels formed in the other surface (or the opposite surface) to the air channel surface where the air sub channels are formed.

As shown in FIG. 8A, the air channel 24 has four air sub channels 41, 42, 43, and 44 arranged in parallel. Four air inlets 22b are arranged for those air sub channels 41, 42, 43, and 44. The air to be supplied flows through the four air inlets 22b into the air sub channels 41, 42, 43, and 44 and is exhausted to outside through the air outlet 22e.

An air buffer region 45 is formed between the four air sub channels 41 to 44 and the air outlet 22e. The air passing through the air sub channels 41 to 44 are joined in the air buffer region 45 and the joined air then flows into the air outlet 22e. The four air sub channels 41 to 44 correspond to plural first air sub channels of the present invention.

When compared with the configuration of the air channel shown in FIG. 3A, the air sub channels having the configuration shown in FIG. 8A can reduce a pressure loss generated at the air channel 24.

If the magnitude of the power of the air supply to supply the air to the fuel cell stack 1 is same, namely is not changed when compared with the first embodiment, the configuration shown in FIG. 8A can increase the amount of the air supply to the fuel cell stack 1. As a result, the amount of the air in the air channel can be increased. This mans increasing the amount of oxygen to be supplied to the fuel cell stack 1 and also increasing the efficiency of the electric power generation.

As shown in FIG. 8B, the cooling water channel has plural cooling water sub channels 51 to 60 in the third embodiment that are formed in parallel to the air sub channels 41 to 44 shown in FIG. 8A.

The cooling water introduced through the cooling water inlet 22c flows through the cooling water sub channels 51 to 60 shown in FIG. 8B in opposite direction to the air flowing through the air sub channels 41 to 44 shown in FIG. 8A. Those plural cooling water sub channels 51 to 60 correspond to plural second cooling water sub channels of the present invention.

In the third embodiment, the separator 22 forming the unit fuel cell 20 has the single cooling water inlet 22c, and the two cooling water outlets 22f, a cooling water buffer region 61 of the inlet end, and a cooling water buffer region 62 of the outlet end.

The cooling water buffer region 61 of the inlet end is formed between the cooling water inlet 22c and the plural cooling water sub channels 51 to 60. The cooling water supplied to the cooling water inlet 22c is then supplied to the plural cooling water sub channels 51 to 60 through the cooling water buffer region 61.

The cooling water buffer region 62 of the outlet end is formed between the cooling water outlets 22f and the plural cooling water sub channels 51 to 60. The cooling water supplied from the plural cooling water sub channels 51 to 60 is joined in the cooling water buffer region 62 and then supplied to both the cooling water outlets 22f.

In the third embodiment shown in FIG. 8A and FIG. 8B, the cooling water inlet 22c is arranged adjacent to the air outlet 22e. Further, the upstream end of each of the plural cooling water sub channels 51 to 60 is arranged at the area corresponding to the downstream end of each of the air sub channel 41 to 44. In other word, the downstream end of each of the plural cooling water sub channels 51 to 60 is arranged at the area corresponding to the upstream end of each of the air sub channel 41 to 44.

Accordingly, the fuel cell system of the third embodiment has the same effect of the fuel cell system of the first and second embodiment.

As shown in FIG. 8A, although the number of the air inlets 22b is four, it is acceptable to form a single air inlet instead of the four air inlets 22b.

Figure 9A:
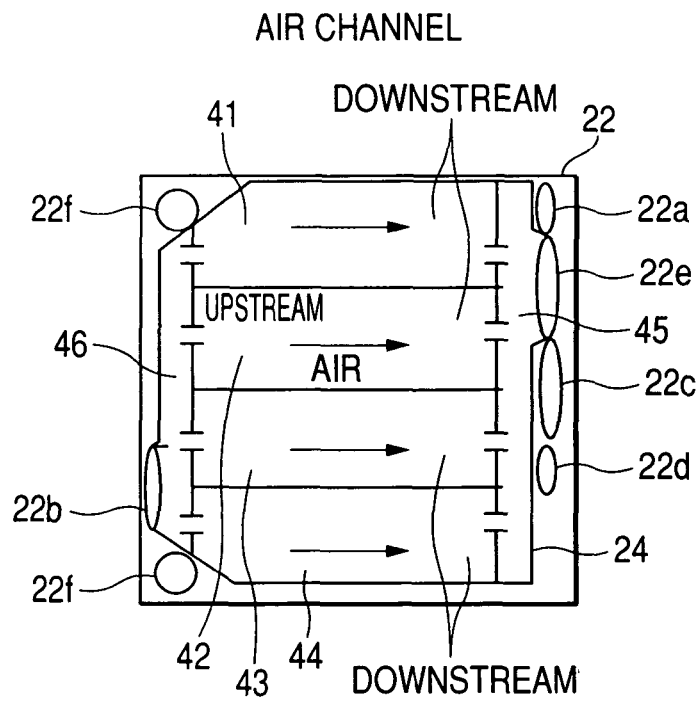
FIGS. 9A and 9B are diagrams showing a configuration of an air electrode end (or a cathode electrode) of a separator forming the unit fuel cell according to a second example of the third embodiment, in particular.
Figure 9B:
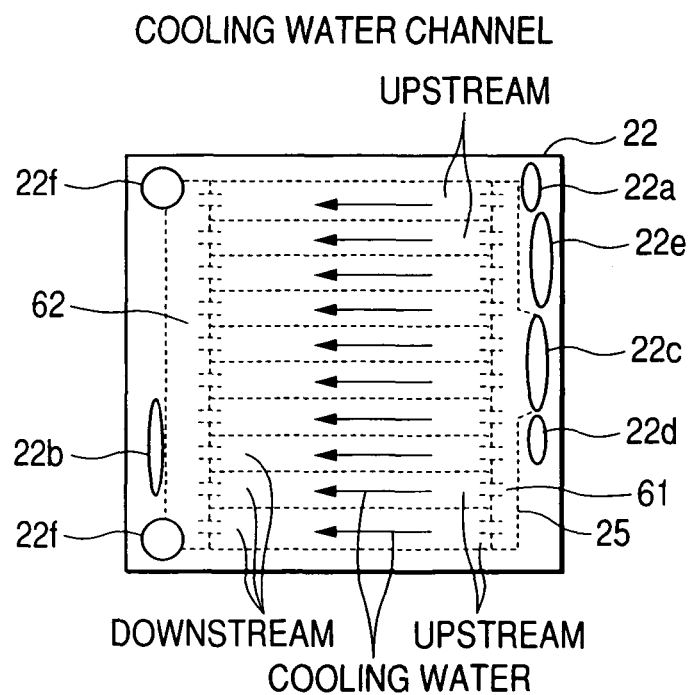

FIGS. 9A and 9B are diagrams showing a configuration of the air electrode end (or the cathode electrode) of the separator forming the unit fuel cell according to the second example of the third embodiment, in particular, FIG. 9A shows the single air inlet 22b and four air sub channels formed in the air channel surface of the separator, and FIG. 9B shows the cooling water sub channels and formed in the other surface (or the opposite surface) to the air channel surface where the air channel is formed.

In the second example of the third embodiment shown in FIG. 9A and FIG. 9B, the number of the air inlet is one. In this case, the air buffer region 46 of the inlet end is formed between the air inlet 22b and the four air sub channels 41 to 44. The air is supplied to the single air inlet 22b and then supplied into the four air sub channels 41 to 44 through the air buffer region 46b of the inlet end. This configuration can suppress the pressure loss of the air generated in the four air sub channels 41 to 44. In addition, having an area of the air buffer region 46 as large as possible can suppress a fluctuation of the pressure loss of the air flow between the four air sub channels 41 to 44.

Other Preferred Embodiments (a) The first embodiment has shown the case that the controller 2 compares in Step 32 the current value measured at the area near the air outlet of the unit fuel cell with the current threshold value that is given in advance. It is possible that the controller 2 calculates a decreased value of the measured current value per a given time period and compares the calculated decreased value with a threshold decrease value that is also given in advance.

In general, if the oxygen concentration in the air is decreased at the area near the air outlet 22e in the air channel 24, the reduced amount of the measured current value per time is increased. The controller 2 judges whether or not the decreased current value per time is the threshold decrease value in order to determine whether or not it is necessary to increase the oxygen concentration at the area near the air outlet 22e in the air channel 24.

(b) The first embodiment has shown the case that the controller 2 compares the current value measured at the area near the air outlet of the unit fuel cell with the current threshold value that is given in advance in order to judge the necessity to increase the oxygen concentration. However, the present invention is not limited by this case, it is possible that the controller 2 calculates the oxygen concentration in the air in the air channel 24 and judges whether or not it is necessary to increase the oxygen concentration based on the calculated oxygen concentration.

For example, the controller 2 calculates the oxygen concentration at the area near the air outlet 22e in the air channel 24 based on an air supply amount and a total current value measured in the unit fuel cell 20, and compares the calculated oxygen concentration with a threshold value that has been set in advance.

Figure 10:
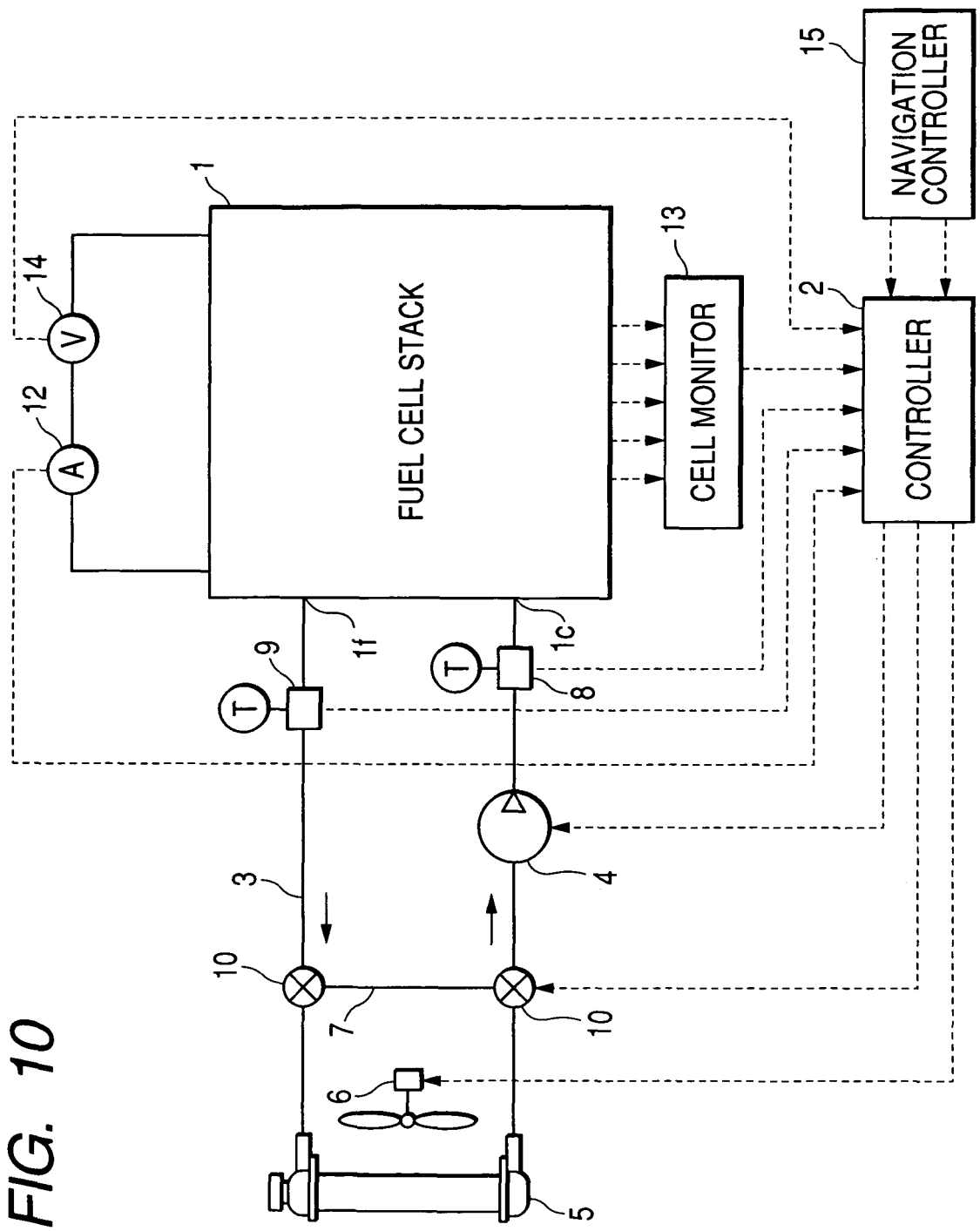
FIG. 10 is a diagram showing an entire configuration of a fuel cell system according to another preferred embodiment of the present invention.

(c) FIG. 10 is a diagram showing an entire configuration of a fuel cell system according to another preferred embodiment of the present invention.

The same components between the fuel cell system of the present preferred embodiment shown in FIG. 10 and the first embodiment shown in FIG. 1 will be referred to with the same reference numbers and the explanation of them is omitted here.

In Step 31 in the manner of the first embodiment, the controller 2 receives the measured value transferred from the current sensor plate 11 as the local current measurement means and in Step 32 the controller 2 compares the measured value with the current threshold value.

In the present preferred embodiment, on the contrary, the fuel cell system shown in FIG. 10 comprises a current sensor 12 as the total current measuring means for measuring the total current of the plural unit fuel cells 20. In this case, the controller 2 can judge whether or not it is necessary to increase a current oxygen concentration at the area near the air outlet 22e in the air channel 24 based on the total current value measured.

This means that the total amount of the electric power generation is decreased if the amount of the current generated in each unit fuel cell 20 is decreased by decreasing the oxygen concentration in the air at the area near the air outlet 22e in the air channel 22.

In this case, it is possible that the controller 2 compares the total current value of the plural unit fuel cells 20 with a threshold value, or the controller 2 calculates the decrease value of the current per time and compares the calculation result with a decrease current threshold value that has been given in advance.

As shown in FIG. 10, the fuel cell system comprises a cell monitor 13 as a cell voltage detection means for detecting a generated voltage of each unit fuel cell 20. Instead of using the local current value, the controller 2 can judge the necessity to increase the oxygen concentration at the area near the air outlet 22e in the air channel 24 based on the cell voltage measured by the cell monitor 13.

Furthermore, as shown in FIG. 10, the fuel cell system comprise a voltage sensor 14 as a total voltage measurement means for measuring the total voltage generated by the plural unit fuel cells 20. In this case, instead of measuring the local current value, the controller 2 can judge the necessity to increase the oxygen concentration at the area near the air outlet 22e in the air channel 24 based on the total voltage measured by the voltage sensor 14

This means that the total voltage of the plural unit fuel cells 20 is decreased according to the decrease of the voltage generated by each unit fuel cell 20 if the oxygen concentration in the air is decreased. In this case, it is also possible that the controller 2 compares the voltage generated by each unit fuel cell 20 or the total voltage value generated by the plural unit fuel cells 20 at a given time with a corresponding threshold value. Furthermore, it is possible that the controller 2 calculates the voltage drop value per time and compares the calculated voltage drop value with a voltage drop threshold value.

On running of a vehicle equipped with the fuel cell system, there is considered that one of main reasons to decrease the total amount of the voltage generated by each unit fuel cell 20 or by the plural unit fuel cells 20 is the decrease of the oxygen concentration at the area near the air outlet 22e in the air channel 24. Accordingly, it is possible to judge the necessity to increase the oxygen concentration based on the cell voltage or the total amount of the voltage generated by the plural unit fuel cells.

As shown in FIG. 10, in a case that a vehicle is equipped with the fuel cell system and a navigation controller 15 for use in a vehicle navigation system (not shown), the controller 2 judges whether or not it is necessary to increase the oxygen concentration at the area near the air outlet 22e in the air channel 24 based on a reception of a control signal that indicates the increase of the running load transferred from the controller 15.

The running load of a vehicle is changed according to a vehicle driving on a flat road or a slope. For example, it is necessary to increase the output power of the fuel cell while the vehicle is running on an uphill slope because the running load of the vehicle becomes increased.

When the vehicle is equipped with the navigation controller 15 for use in a vehicle navigation system, the controller 15 predicts the necessary to increase the running load based on a target destination or a forward direction of the vehicle. The controller 2 judges the necessity to increase the oxygen concentration at the area near the air outlet 22e in the air channel 24 based on the predicted data obtained by the navigation controller 15. By the way, it is possible that the controller 2 executes the prediction operation instead of the navigation controller 15.

Figure 11:
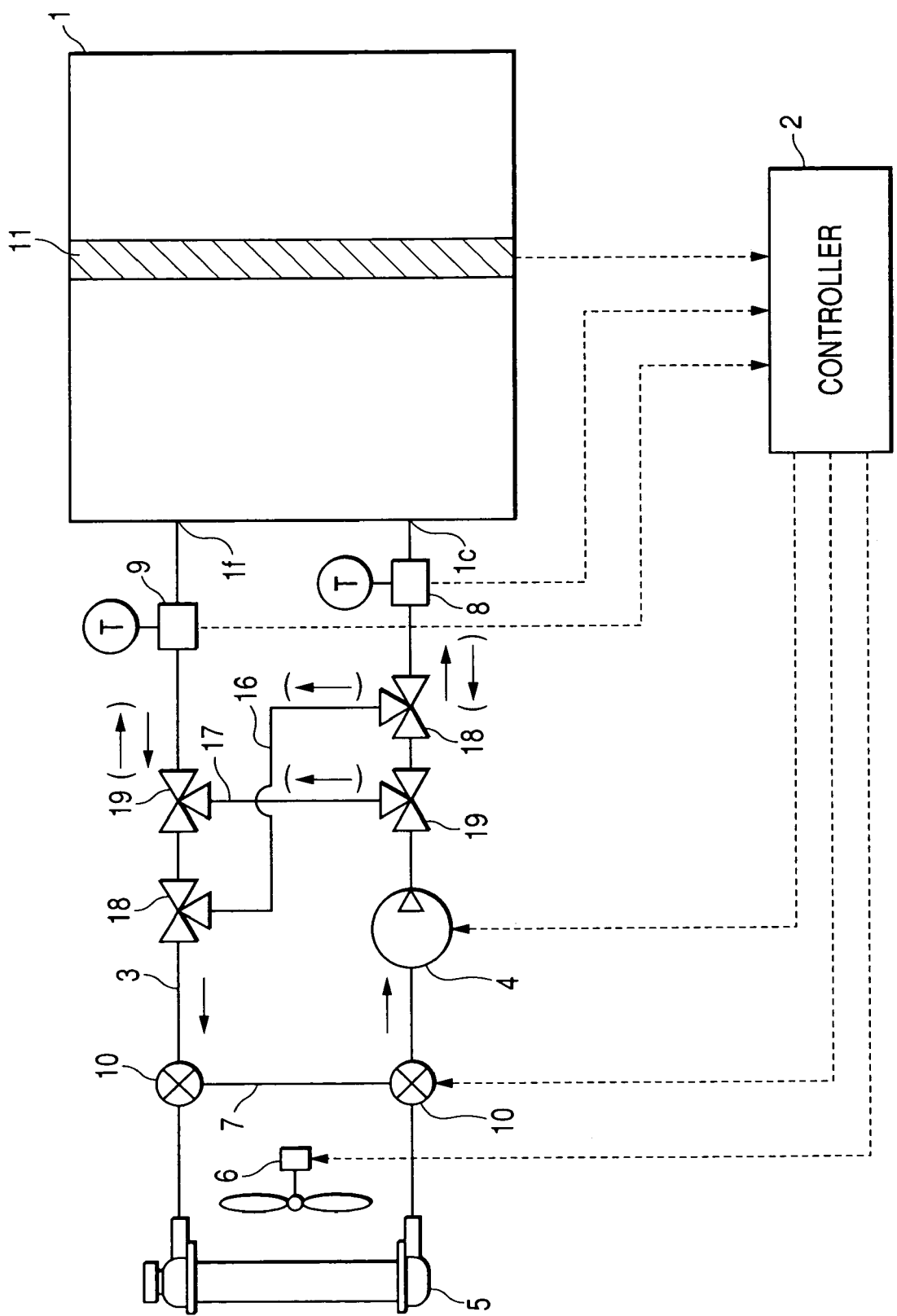
FIG. 11 is a diagram showing an entire configuration of a fuel cell system according to another preferred embodiment of the present invention.

(d) FIG. 11 is a diagram showing an entire configuration of the fuel cell system according to another preferred embodiment of the present invention.

The same components between the fuel cell system of the present preferred embodiment shown in FIG. 11 and the first embodiment shown in FIG. 1 will be referred to with the same reference numbers and the explanation of them is omitted here.

The various embodiments described above have shown the configurations in which the air outlet 22e in the air channel 24 is arranged near the cooling water inlet 22c in the cooling water channel 25, and the upstream part of the cooling water channel 25 corresponds in position to the downstream part of the air channel 24.

However, the present invention is not limited by this configuration, it is possible to have the configuration in which the cooling water inlet 22c is arranged near the air inlet 22b and the upstream end of the cooling water channel 25 corresponds in position to the upstream end of the air channel 24. Under the configuration of the unit fuel cell, the fuel cell system has the following configuration.

In the configuration shown in FIG. 11, cooling water channels 16 and 17 and switching valves 18 and 19 are installed for use in switching the flowing direction of the cooling water. The controller 2 generates and transfers the instruction to switch the flowing direction of the cooling water to the switching valves 18 and 19 in Step 33 (see the flowchart shown in FIG. 4) in the cooling water temperature control process.

In the configuration shown in FIG. 11, before the execution of Step 33 under the controller 2, the cooling water is supplied to the unit fuel cell 20 through the cooling water inlet (corresponding to the air inlet 22b end of the air channel 24). After the execution of Step 33, the cooling water is supplied to the unit fuel cell 20 through the cooling water inlet (corresponding to the air outlet 22e end of the air channel 24) by switching the switching valves 18 and 19. Thus, the flowing direction of the cooling water flowing through the cooling water channel 3 is switched only during the execution of the cooling water temperature control process. The cooling water is supplied to the fuel cell stack 1 from the corresponding air outlet 22e end in the air channel.

This can cool the cooling water at the down stream end prior to the cooling water of the other portions in the air channel 24.

In addition, it is acceptable to switch the flowing direction of the cooling water in the unit fuel cell 20 by using the water pump 4 instead of the switching valves 18 and 19.

Furthermore, it is possible to have another different manner in which the controller 2 executes the cooling water temperature control process even the cooling water is supplied from the corresponding air inlet 22b end of the air channel 24 under the configuration that the cooling water inlet 22c is arranged adjacent to the air inlet 22b and the upstream part of the cooling water channel 25 is arranged at the area in position corresponding to the upstream end of the air channel 24. This configuration involves following problems. When the temperature of the air at the area near the air outlet 22e in the air channel is changed to the condensation available temperature by using the cooling water, the temperature of the air at the area near the air inlet 22b becomes lower than that at the area near the air outlet 22e. This decreases the entire temperature of the unit fuel cell 20 and thereby decreases the electric power efficiency. Accordingly, because the temperature of the air at the area near the air inlet 22b becomes lower than that at the area near the air outlet 22e, the saturation water vapor pressure of the air at the area near the air inlet 22b is lower than that near the air outlet 22e.

In order to eliminate those problems described above, it is preferred that the upstream end of the cooling water channel 25 is placed at the area in position corresponding to the downstream part of the air channel 24, or at least the controller 2 controls to cool the cooling water corresponding to the downstream part of the air channel 24 prior to the other parts of the cooling water in the cooling water channel 25.

(e) In the various embodiments described above, the controller 2 judges whether or not it is necessary to increase the oxygen concentration at the area near the air outlet 22e in the air channel 24, like Step 32, and if the judged result indicates the necessity to increase the oxygen concentration, the controller 2 controls to set the temperature of the cooling water to the condensed available temperature in Step 33.

However, the present invention is not limited by this manner. For example, it is acceptable to avoid such an operation by the controller 2. That is, it is possible to maintain always the temperature of the cooling water, flowing through the cooling water channel 3, at the area near the corresponding air outlet 22e of the air channel 24 at the condensation available temperature. For instance, by using the radiator 5 and the cooling wind fun 6, the temperature of the cooling water is always kept at the temperature 60° C.

(f) In the various embodiments described above, the cooling water inlet 22c is arranged in position near the air outlet 22e. However, the present invention is not limited by this configuration. For example, it is acceptable to have another configuration in which the downstream end of the air channel 24 is cooled prior to the upstream end of the air channel 24 and the cooling water inlet is arranged at another different area. It is possible that the cooling water inlet 22c is arranged in position at the area near the air outlet 22e and at the corresponding area of the air outlet 22e.

(g) The above various embodiments have shown that the fuel cell system is equipped with the fuel cell stack 1 comprising the cooling water channel 25 arranged at the various areas described above. However, the present invention is not limited by those configurations. For example, it is acceptable to apply the fuel cell stack of the various configurations described above into the fuel cell system without any controller.

(h) The above various embodiments have shown that the cooling water is used as a coolant. However, the present invention is not limited by this. For example, it is acceptable to use another liquid, a gas instead of the cooling water.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A fuel cell system comprising:
   a fuel cell stack comprising plural unit fuel cells, each unit fuel cell comprising a fuel electrode, an air electrode, and an electrode membrane placed between the fuel electrode and the air electrode, a fuel gas channel through which a fuel gas is supplied to the fuel electrode, and an air channel through which air is supplied to the air electrode, and a coolant channel through which a coolant flows;
   coolant temperature control means configured to adjust a temperature of the coolant;

judgment means configured to judge whether or not it is necessary to increase an oxygen concentration in the air at an area near an air outlet of the air channel; and generation and output means programmed to generate based on the judgment result transferred from the judgment means an instruction signal indicating that the temperature of the coolant is changed to a concentration available temperature at which a water vapor in the air at the area near the air outlet in the air channel and then to output the instruction signal to the coolant temperature control means to adjust a temperature of the coolant.

2. The fuel cell system according to claim 1, further comprising local current measurement means configured to measure a current generated at the area near the air outlet of the air channel, wherein the judgment means judges whether or not it is necessary to increase the oxygen concentration in the air at the area near the air outlet in the air channel based on the measurement result transferred from the local current measurement means.

3. The fuel cell system according to claim 1, further comprising total current measurement means configured to measure a total current generated by all of the plural unit fuel cells, wherein the judgment means judges whether or not it is necessary to increase the oxygen concentration in the air at the area near the air outlet in the air channel based on the measurement result transferred from the total current measurement means.

4. The fuel cell system according to claim 1, further comprising cell voltage measurement means configured to measure a voltage generated by the unit fuel cell, wherein the judgment means judges whether or not it is necessary to increase the oxygen concentration in the air at the area near the air outlet in the air channel based on the measurement result transferred from the cell voltage measurement means.

5. The fuel cell system according to claim 1, further comprising total voltage measurement means configured to measure a total voltage generated by the plural unit fuel cells, wherein the judgment means judges whether or not it is necessary to increase the oxygen concentration in the air at the area near the air outlet in the air channel based on the measurement result transferred from the total voltage measurement means.

6. The fuel cell system according to claim 1, further comprising running load prediction means configured to predict a running load of a vehicle equipped with the fuel cell system, wherein the judgment means judges whether or not it is necessary to increase the oxygen concentration in the air at the area near the air outlet in the air channel based on the prediction result transferred from the running load prediction means.

7. The fuel cell system according to claim 1, wherein in each unit fuel cell an upstream part of the coolant channel is arranged at an area in position corresponding to a downstream part of the air channel.

8. The fuel cell system according to claim 1, wherein in each unit fuel cell a coolant inlet of the coolant channel is arranged at an area in position corresponding to an air outlet of the air channel.

9. The fuel cell system according to claim 7, wherein each unit fuel cell comprises plural coolant inlets through which the coolant is supplied to the coolant channel, one of the plural coolant inlets is arranged at an area in position corresponding to the air outlet of the air channel, and one of the other plural coolant inlets is arranged at an area in position corresponding to the air inlet of the air channel, and the coolant of the condensation available temperature, at which the water vapor involved in the air at the area near the air outlet of the air channel is condensed, is introduced into the coolant channel through the plural coolant inlets.

10. The fuel cell system according to claim 8, wherein each unit fuel cell comprises plural coolant inlets through which the coolant is supplied to the coolant channel, wherein one of the plural coolant inlets is arranged at an area in position corresponding to the air outlet of the air channel, and one of the other plural coolant inlets is arranged at an area in position corresponding to the air inlet of the air channel, and the coolant of the condensation available temperature, at which the water vapor involved in the air at the area near the air outlet of the air channel is condensed, is introduced into the coolant channel through the plural coolant inlets.

11. The fuel cell system according to claim 7, wherein the air channel comprises plural first channels arranged in parallel to each other through which the air introduced through the air inlet flows to the air outlet in a same direction, the coolant channel comprises plural second channels arranged in parallel to the plural first channels forming the air channel, wherein the coolant introduced through the coolant inlet flows to the coolant outlet in opposite direction to the flowing direction of the air in the plural first channels in the air channel.

12. The fuel cell system according to claim 8, wherein the air channel comprises plural first channels arranged in parallel to each other through which the air introduced through the air inlet flows to the air outlet in a same direction, the coolant channel comprises plural second channels arranged in parallel to the plural first channels forming the air channel, wherein the coolant introduced through the coolant inlet flows to the coolant outlet in opposite direction to the flowing direction of the air in the plural first channels in the air channel.

* * * * *